United States Patent [19]

Strong et al.

[11] Patent Number: 5,791,291

[45] Date of Patent: Aug. 11, 1998

[54] METHOD AND APPARATUS FOR CLEANING FISH SCREENS

[76] Inventors: James J. Strong, 909 Benjamin Way, Healdsburg, Calif. 95448; Robert K. Weir, 2390 Forest St., Denver, Colo. 80207

[21] Appl. No.: 782,881

[22] Filed: Jan. 14, 1997

[51] Int. Cl.$^6$ ............................................. A01K 63/00
[52] U.S. Cl. ............................................. 119/219
[58] Field of Search ........................... 119/219, 211, 119/200, 201, 215, 234, 245, 264, 269, 259

[56] References Cited

U.S. PATENT DOCUMENTS

| | | | |
|---|---|---|---|
| 4,052,960 | 10/1977 | Birrbeck et al. | 119/3 |
| 4,915,059 | 4/1990 | Long | 119/3 |
| 5,558,462 | 9/1996 | O'Haver | 405/81 |
| 5,637,221 | 6/1997 | Coyne | 210/608 |

*Primary Examiner*—Thomas Price
*Attorney, Agent, or Firm*—Larry D. Johnson

[57] ABSTRACT

An apparatus and method for continuously cleaning fish screens located in wetland diversions which are subject to tidal fluctuations, as well as in river and stream diversions, provides a brush or wiper member attached to a flotation device to clean the fish screen continuously. The apparatus can utilize conventional power where available, or utilize available and renewable energy sources such as tidal influx, solar or wind power, as well as gravity water flow.

16 Claims, 2 Drawing Sheets

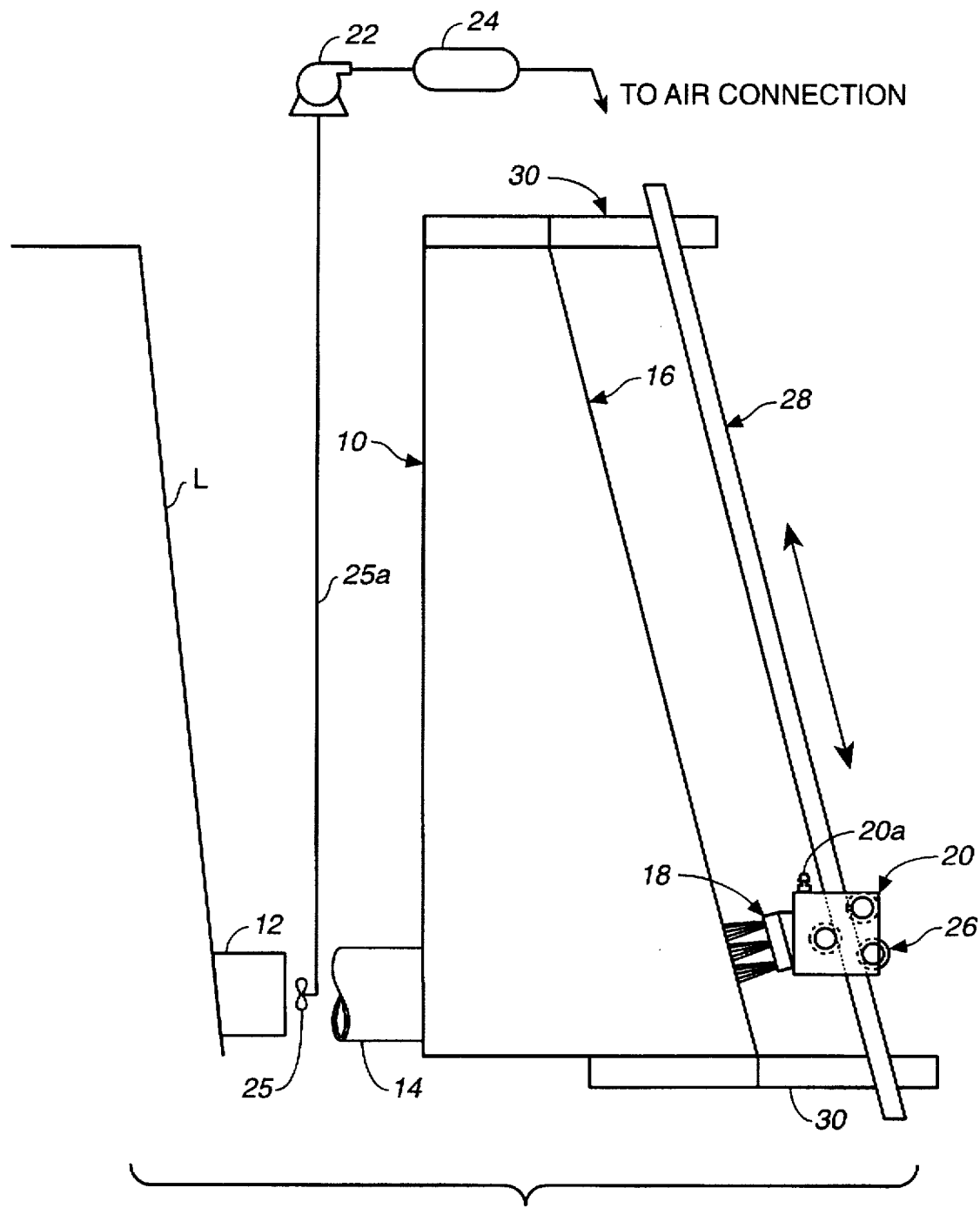
FIG._1

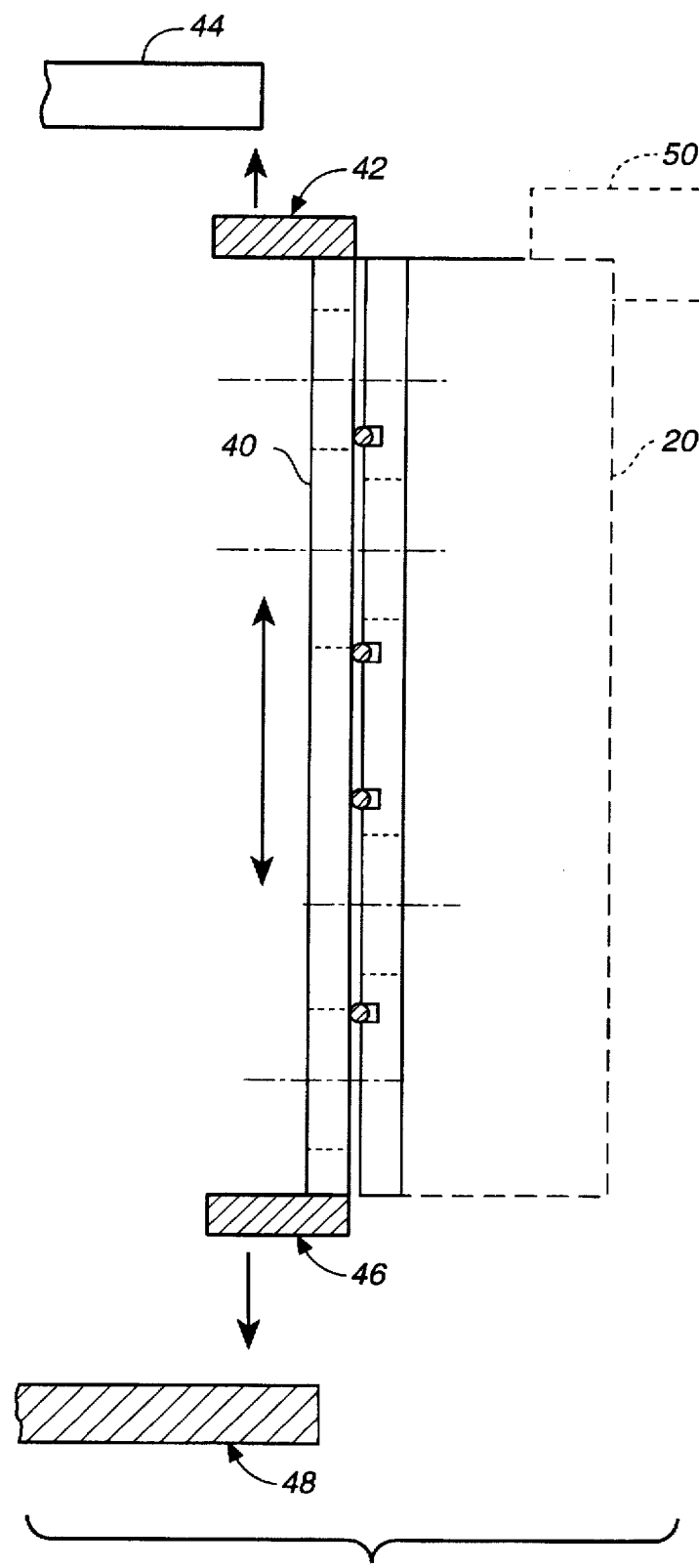
FIG._2

METHOD AND APPARATUS FOR CLEANING FISH SCREENS

BACKGROUND OF THE INVENTION

1. Field of the Invention

This invention relates generally to hardware and materials used in water diversion systems, and more specifically to an improved method and apparatus for cleaning the fish screens used in such systems.

2. Description of the Prior Art

There are numerous water diversion projects that utilize culverts, irrigation ditches, or other passages to divert water for the purpose of irrigation and wetlands water management. Many of these diversion projects were constructed forty or more years ago, and did not include fish screens to prevent the entrainment and diversion of fish species into areas of unsuitable fish habitat, such as into an environment that would eventually cause the death of the fish. Recent enactment of the Endangered Species Act has pointed out the need for the development of methods that will, inter alia, protect the fish whose natural habitat is in rivers, streams, as well as marshes and sloughs adjacent to fresh and salt water bays and estuaries. Installation of suitable fish screens at these diversions would benefit such endangered species by precluding or inhibiting entrainment of the fish into the improper environment, thus enhancing the survival of the species.

Some state regulatory agencies now stipulate that continuously cleaned fish screens must have a minimum open area, e.g., 1 ½ square foot per cubic foot/second of water flow, while fish screens that are not continuously cleaned must have a considerably greater minimum open area, e.g., six square foot per cubic foot/second of water flow. Given that the material used in these fish screens is relatively expensive, and the screen area involved can be significant, there is obviously a great benefit in providing a means of continuously cleaning the fish screens, because substantially less screen area is required as opposed to non-continuously cleaned screens (e.g., twenty-five percent of the screen area).

In the past, and even now in locations where electricity is not available, there was no alternative but to size the fish screens on the basis of a larger, non-continuously cleaned screen. Where electricity is available, conventional "state of the art" fish screen cleaning mechanisms utilize a brush driven by a cable and pulley mechanism powered by a reversible electric motor. Although such systems are relatively inexpensive, they have many inherent problems.

For example, one problem with such systems is that electrical power is required to operate the brush cleaning mechanism. Another problem is that the moving parts of the system are subject to considerable maintenance, which in addition to being costly and time-consuming, often requires the removal of the fish screens, thereby exposing the fish to the danger of an unscreened diversion.

Because of such problems, there exists a need for a method to continuously clean fish screens, especially at remote sites where electricity is not available. The fish screen cleaning apparatus should have few moving parts, be inexpensive and simple to install, and require low maintenance.

SUMMARY OF THE INVENTION

This invention provides both an apparatus and a method for continuously cleaning fish screens located in wetland diversions which are subject to tidal fluctuations, as well as in river and stream diversions. The inventive apparatus provides a wiper or brush member attached to a flotation device to continuously clean the fish screen. The operation of the apparatus can utilize conventional power where available, or in the absence of such conventional power, can operate by utilizing available and renewable energy sources such as tidal influx, solar or wind power, or the kinetic energy from gravity-flowing water.

For the preferred embodiment where tidal fluctuations may involve culverts larger than 30 inches in diameter, as well as for use with several such culverts in a row, the inventive apparatus provides a "stand alone" pre-fabricated steel or other frame structure incorporating flat fish screen panels mounted on driven steel pilings, or on a concrete base, in front of the culvert(s). Each flat fish screen panel utilizes a flotation device (e.g., a rectangular flotation chamber three feet to five feet wide, by approximately six inches in height) upon which the screen cleaning brushes or wipers are mounted, within a vertical guide assembly on either side of the fish screen panel.

The preferred embodiment of the inventive apparatus further includes an internal impeller, e.g., located in a straight section of culvert upon which the "stand alone" steel structure is mounted. In the situation where a plurality of the "stand alone" steel structures are placed in front of several culverts in a row, the internal impellers may be mounted in a straight section of each culvert. The impeller is actuated by the energy imparted by the flow of water due to tidal fluctuations. The rotational energy of the impeller is coupled upward to an air compressor by a shaft. The shaft drives the air compressor and pressurized air is transferred by flexible tubing to the float chamber.

A cycle begins with the float chamber at the bottom of the screen panel. As the air moves into the float chamber, water is displaced creating an upward force which drives the chamber and its attached brushes up the screen until the device encounters a valve stop at the top end of the frame structure. When the chamber hits this stop, air is released from the chamber by a trip valve, and the chamber and cleaning brushes sink to the base of the screen panels, the air valve closes, and the cycle repeats itself.

Thus, each screen panel may be cleaned sequentially in a vertical wiping action by energy imparted by the flow of water due to tidal fluctuations. Alternatively, power to drive the air compressor may be derived from solar sources, wind or other source. Where electricity is available, a conventional electric motor may provide the power to drive the air compressor, otherwise all of the other aspects described above may remain the same.

BRIEF DESCRIPTION OF THE DRAWINGS

FIG. 1 is a side elevation view of a fish screen cleaning apparatus of this invention, illustrating a brush/wiper mechanism operated by a float chamber; and FIG. 2 is a detail of a trip valve to control air release from the float chamber.

DETAILED DESCRIPTION OF A PREFERRED EMBODIMENT

FIG. 1 is a side elevation view of a fish screen cleaning apparatus of this invention. A pre-fabricated "stand alone" steel structure 10 is placed adjacent to a levee L having a culvert 12 (or grouping of culverts) serving as an intake for irrigation purposes. Stub-out connections 14 on the structure 10 attach to the culvert(s) 12. The structure incorporates flat fish screen panels 16 to protect fish from entering into a hostile environment. The screen 16 is continuously cleaned by means of a wiper or brush 18 attached to a float chamber 20. An air compressor 22 powered by either a conventional power source, or tidal, solar or other energy in the absence of conventional power, produces compressed air for storage in a receiver tank 24. For example, impeller 25 placed in culvert 12 may be driven by tidal fluctuations to power shaft 25a to compressor 22. Pressurized air introduced into the float chamber 20 at air intake 20a displaces water causing the brush/wiper 18 to rise. Positioners such as rollers 26 on either side of the float chamber 20 maintain alignment along the guiderods 28 which are attached to both ends of the flat screen panels on the structure by support brackets 30.

FIG. 2 is a detail of a trip valve 40 which may be used to control air release from the float chamber. As the float chamber 20 rises to the top of the screen panel 16 during high tide, stop tab 42 engages a top stop 44 which causes the trip valve 40 to reposition itself for release of air from the float chamber. The brush/wiper mechanism then descends by gravity until start tab 46 contacts bottom stop 48, which causes the trip valve to close so that air can once again displace the water in the float chamber to start the cleaning cycle once again. Alternatively, air in the float chamber may be automatically evacuated when the float chamber reaches whatever the water level happens to be through a surface-activated relief valve such as float valve 50.

Thus, the inventive apparatus can be used for screening intake water at wetland water diversions subject to tidal fluctuations. The pre-fabricated steel structure for supporting the flat screen panels can be installed on either pilings or a concrete base, with stubouts for connection to the culvert (s). Alternatively, the structure may be placed adjacent an irrigation ditch, stream, river feeding into an irrigation ditch, or other source of intake water. The structure may be arranged as modules approximately five feet wide in order that the fish screen panels may be continuously cleaned by means of a flotation wiper/brush mechanism affixed to each panel.

Each screen may have an array of profile wire elements with openings from approximately 1/16" wide to approximately 1/8" wide with inwardly enlarging openings, and the slots may be continuously arranged either vertically or horizontally.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An apparatus for screening a source of intake water at wetland water diversions subject to tidal fluctuations, said apparatus comprising:

a frame structure adapted for placement adjacent the source of intake water;

at least one fish screen panel attached to said frame structure and over the source of intake water;

a float chamber slidably connected to said frame structure;

a brush member attached to said float chamber and adjacent said fish screen panel; and means for selectively delivering compressed air into said float chamber, wherein when compressed air is delivered into said float chamber, water in said float chamber is displaced and said float chamber floats vertically upward on said frame structure to urge said brush member into contact with and clean said fish screen panel.

2. The apparatus for screening intake water of claim 1 wherein said float chamber is mounted on positioners to maintain alignment.

3. The apparatus for screening intake water of claim 1 wherein said means for selectively delivering compressed air into said float chamber comprises an air compressor connected to said float chamber.

4. The apparatus for screening intake water of claim 3 wherein said air compressor delivers air to a storage reservoir which is connected to said float chamber.

5. The apparatus for screening intake water of claim 1 wherein said means for selectively delivering compressed air into said float chamber comprises an impeller driven by flowing water.

6. The apparatus for screening intake water of claim 5 wherein said impeller is coupled to an air compressor by a shaft.

7. The apparatus for screening intake water of claim 1 wherein said means for selectively delivering compressed air into said float chamber includes a trip valve to control air release from said float chamber.

8. The apparatus for screening intake water of claim 7 wherein said trip valve includes a stop tab to engage a top stop on said frame structure.

9. The apparatus for screening intake water of claim 7 wherein said trip valve includes a start tab to contact a bottom stop on said frame structure.

10. The apparatus for screening intake water of claim 1 wherein said means for selectively delivering compressed air into said float chamber comprises an air compressor powered by electricity.

11. A method for cleaning a fish screen panel on an apparatus for screening a source of intake water, said method comprising the steps of:

placing a frame structure adjacent the source of intake water;

placing at least one fish screen panel on said frame structure and over the source of intake water;

slidably connecting a float chamber to said frame structure;

attaching a brush member to said float chamber and adjacent said fish screen panel; and selectively delivering and releasing compressed air into said float chamber, so that when compressed air is delivered into said float chamber, water in said float chamber is displaced and said float chamber floats vertically upward on said frame structure to urge said brush member into contact with and clean said fish screen panel, and when compressed air is released from said float chamber, water returns into said float chamber and said float chamber sinks vertically downward on said frame structure to urge said brush member into contact with and clean said fish screen panel.

12. The method for cleaning a fish screen panel on an apparatus for screening intake water of claim 11 further including the step of:

attaching positioners on said frame structure to maintain alignment.

13. The method for cleaning a fish screen panel on an apparatus for screening intake water of claim 11 further including the step of:

selectively delivering compressed air into said float chamber with an air compressor connected to said float chamber.

14. The method for cleaning a fish screen panel on an apparatus for screening intake water of claim 11 further including the step of:

selectively delivering compressed air into said float chamber with an impeller driven by tidal fluctuations.

15. The method for cleaning a fish screen panel on an apparatus for screening intake water of claim 11 further including the step of:

selectively delivering compressed air into said float chamber with a trip valve to control air release from said float chamber.

16. The method for cleaning a fish screen panel on an apparatus for screening intake water of claim 11 further including the step of:

selectively delivering compressed air into said float chamber with an air compressor powered by electricity.

* * * * *